(12) United States Patent
Palaskas et al.

(10) Patent No.: US 9,209,958 B1
(45) Date of Patent: Dec. 8, 2015

(54) SEGMENTED DIGITAL-TO-TIME CONVERTER CALIBRATION

(71) Applicant: Intel Corporation, Santa Clara, CA (US)

(72) Inventors: Georgios Palaskas, Portland, OR (US);
Paolo Madoglio, Beaverton, OR (US);
Stefano Pellerano, Beaverton, OR (US);
Ashoke Ravi, Hillsboro, OR (US);
Kailash Chandrashekar, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/318,799

(22) Filed: Jun. 30, 2014

(51) Int. Cl.
*H03K 7/06* (2006.01)
*H03C 3/00* (2006.01)
*H04L 27/12* (2006.01)
*H04L 7/00* (2006.01)
*H04B 17/21* (2015.01)

(52) U.S. Cl.
CPC .............. *H04L 7/0004* (2013.01); *H04B 17/21* (2015.01); *H04L 7/0087* (2013.01)

(58) Field of Classification Search
CPC ..... H04L 7/0004; H04L 7/0087; H04L 27/12; H04L 27/127; H04B 17/21; H04B 17/11
USPC ......................................... 375/271, 302, 296
See application file for complete search history.

(56) References Cited

U.S. PATENT DOCUMENTS

| 7,292,618 | B2* | 11/2007 | Tal et al. ...................... 375/132 |
| 7,555,057 | B2* | 6/2009 | Staszewski et al. ........... 375/296 |
| 7,801,262 | B2* | 9/2010 | Wallberg et al. .............. 375/376 |
| 7,813,462 | B2* | 10/2010 | de Obaldia et al. ........... 375/376 |
| 2008/0315959 | A1* | 12/2008 | Zhuang et al. .................... 331/17 |
| 2009/0097609 | A1* | 4/2009 | Chang et al. ................... 375/376 |
| 2009/0141845 | A1* | 6/2009 | Ballantyne et al. ........... 375/376 |
| 2012/0319749 | A1* | 12/2012 | Thaller et al. .................. 327/158 |
| 2015/0049840 | A1* | 2/2015 | Banin et al. .................... 375/297 |
| 2015/0091384 | A1* | 4/2015 | Madoglio et al. ............. 307/104 |

\* cited by examiner

*Primary Examiner* — Phuong Phu
(74) *Attorney, Agent, or Firm* — Schwegman Lundberg & Woessner, P.A.

(57) ABSTRACT

This application discusses, among other things, calibration systems for ameliorating nonlinearity of a digital-to-time converter (DTC). In an example, a calibration system can include a calibration path configured to represent a segment of the DTC, a time-to-digital circuit configured to receive an output of the calibration path and the processed frequency information and to provide timing error information of the segment, and a calibration engine configured to receive controller modulation information from a main controller, to provide calibration modulation information to the DTC, to receive the timing error information, and to provide compensation information to a correction circuit coupled to the DTC using the timing error information.

23 Claims, 8 Drawing Sheets

SEGMENTED DIGITAL-TO-TIME CONVERTER CALIBRATION

BACKGROUND

Digital to time converters (DTC) are planned to be introduced in cellular transmitters. DTCs can simplify radio architectures for wideband LTE (LTE-A), multiple-input multiple-output (MIMO) uplink, inter-band and non-contiguous intra-band carrier aggregation by eliminating the need for a local oscillator for each transmission and reception frequency. DTCs can often include multiple stages to provide a desired frequency. Mismatch between stages of a DTC can exhibit discontinuities that can negatively affect out-of-band noise

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
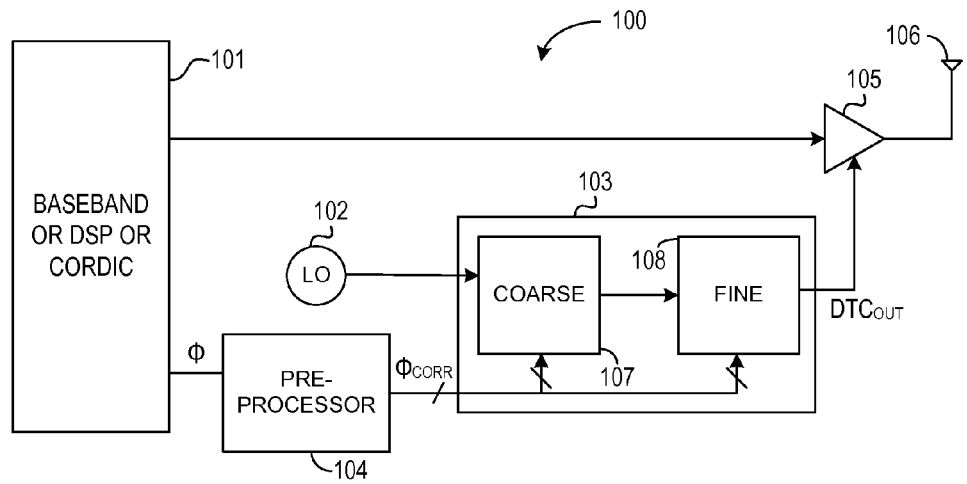
FIG. 1 illustrates generally a DTC-based architecture.

The present inventors have recognized apparatus and methods for calibrating DTCs to compensate for mismatches between DTC stages and thus provide robust wide-band performance without significantly affecting out-of-band noise. FIG. 1 illustrates generally a DTC-based architecture 100. The illustrated architecture is shown for an example transmitter, however, DTCs can be employed in receiver circuits to provide a desired receiver frequency reference. In certain examples, the architecture 100 can include a processor 101, a local oscillator 102, DTC 103, a pre-processor 104 for the DTC 103, a amplitude stage 105 and an antenna 106. In certain examples, the processor 101 can include a baseband processor such as for a mobile electronic device, a digital signal processor (DSP) or a Cordic converter for providing amplitude and phase modulation information representative of digital transmission data. In certain examples, some known non-linearity of the architecture 100 can be compensated for using the pre-processor 104 for the DTC such that the pre-processor 104 receives phase modulation information (Φ) from the processor and provides corrected phase information ($\Phi_{CORR}$) to the DTC 103. The DTC 103 can receive a reference clock signal or reference frequency or clock information from the local oscillator 102 and the phase modulation information (Φ) from the processor 101 or corrected phase modulation information ($\Phi_{CORR}$) from the pre-processor 104. The DTC 103 can provide a phase modulated signal ($DTC_{OUT}$) at a desired frequency using the local oscillator 102 and the phase modulation information (Φ). The power amplifier 105 can mix the phase modulated signal ($DTC_{OUT}$) with amplitude information to provide a transmission signal. The antenna 106 can broadcast the transmission signal for reception by a second device. In certain examples, such as for MIMO systems, additional DTCs can use the local oscillator to provide additional channel frequencies. In certain examples, the DTC 103 can be segmented into stages 107, 108 that sequentially provide finer and finer phase delays. In certain examples, DTCs can be implemented as a cascade of coarse and fine modulator stages to minimize power dissipation. The present examples, discuss a two stage DTC 103 having a coarse stage 107 and a fine stage 108, however, it is understood that DTCs can include additional stages without departing from the scope of the present subject matter.

In certain examples, the coarse stage 107 can be responsive to a first number of bits of the phase modulation information, typically the most significant bits, and the fine stage 108 can be responsive to a second number of bits of the phase modulation information, typically, the remaining bits. For example, if the coarse stage 107 is responsive to M bits, $2^M$ delay intervals of the local oscillator can be selected where each coarse delay interval $\Delta T_{COARSE}$ is about equal to $$\frac{1}{2^M} * T_{LO},$$

where $T_{LO}$ is the period of the local oscillator. In addition, the fine stage 108 can then provide finer modulation of each coarse delay interval. For example, if the fine stage 108 is responsive to N bits, each fine stage interval can be about $$\frac{1}{2^N} * \Delta T_{COARSE}.$$

In certain examples, the fine stage 108 can provide modulation on the order of less than 1 picosecond. In certain examples, the fine stage 108 can be implemented using a digitally controlled delay line (DCDL) where incremental delay can be changed according to the N bits of the phase modulation information. As discussed briefly above, mismatch in the form of unequal coarse delay intervals, both static and dynamic, and coarse delay interval drift can affect out of ban noise and overall DTC operation if such mismatch is not compensated. The present inventors have recognized apparatus and methods that can measure, for example in a foreground calibration or start-up mode, mismatch between the coarse stage 107 or stages and the range (or gain) of the fine stage 108. The measured mismatch or errors can be used to provide run-time compensation, for example, implemented by the pre-processor 104. In certain examples, such as systems that do not create the coarse phases by a cascade delay, the same apparatus can be used for a background or run-time calibration circuit and method that can track the fine stage gain and provide drift error information.

Figure 2:
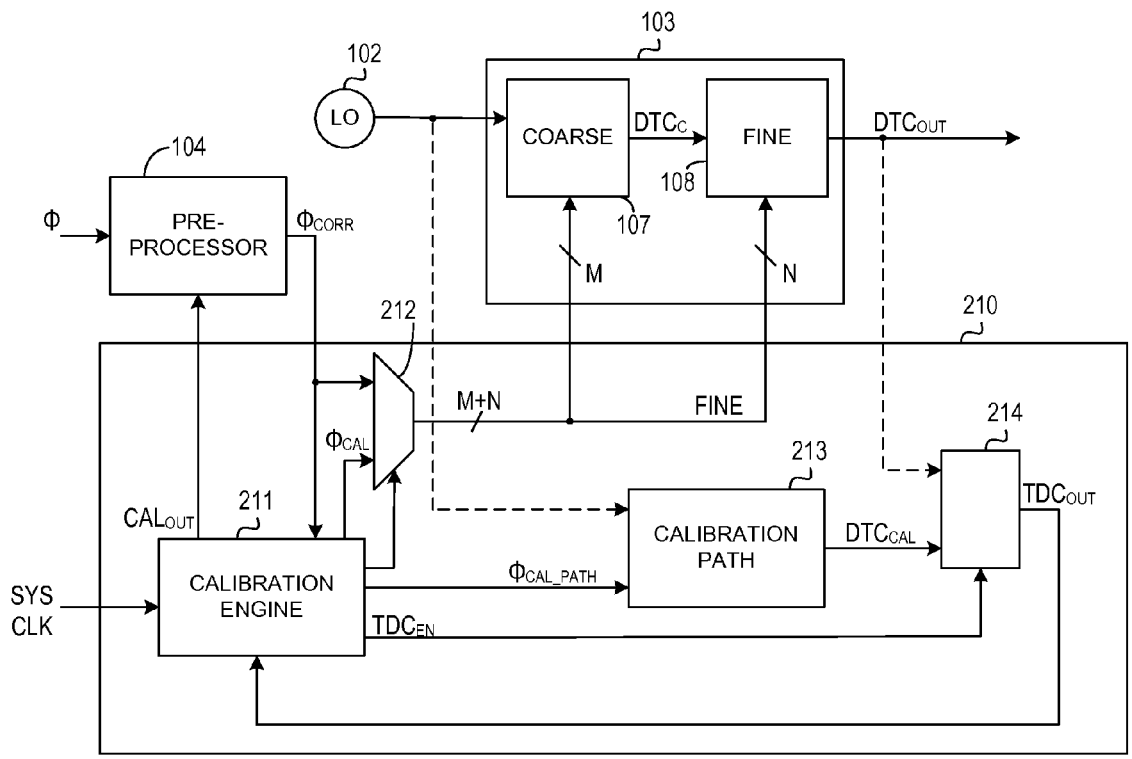
FIG. 2 illustrates generally the architecture of FIG. 1 with an example calibration circuit.

FIG. 2 illustrates generally the architecture of FIG. 1 with an example calibration circuit 210. In certain examples, the calibration circuit 210 can include a calibration engine 211, a switch 212 or multiplexer, a calibration path 213 and a time-to-digital circuit 214. The calibration engine 211 can control the calibration circuit 210 and sequences of the various foreground and background calibrations or calibration modes. In certain examples, the switch 212, in a first state, can provide either corrected phase modulation information ($\Phi_{CORR}$) from the preprocessor 104 or, in a second state, calibration phase modulation information ($\Phi_{CAL}$) from the calibration engine 211. In certain examples, the calibration path 213 can be a representation of a delay element or a stage of the DTC 103 to be measured and compensated, such as a representation of the coarse stage 107, a representation of the fine stage 108, or a representation of the coarse stage 107 and the fine stage 108. In certain examples, the calibration path 213 can receive calibration modulation settings ($\Phi_{CAL\_PATH}$) from the calibration engine 211. In some examples, the calibration path 213 can optionally receive local oscillator information. In certain examples, the time-to-digital circuit 214 can receive a calibration path output ($DTC_{CAL}$) and the DTC output ($DTC_{OUT}$) and can provide error information $TDC_{OUT}$ representative of a difference between transition of each of the calibration path output ($DTC_{CAL}$) and the DTC output ($DTC_{OUT}$). In some examples, the time-to-digital circuit 214 can receive enable information ($TDC_{EN}$) such that the time-to-digital circuit 214 can be disabled when the foreground calibrations are not in operation or when a background calibration does not anticipate a measurement event. In certain examples, the ability to disable the time-to-digital circuit 214 can represent significant energy savings, especially for application of the DTC 103 in mobile electronic devices. In certain examples, the time-to-digital circuit 214 can include a time-to-digital converter (TDC). In some examples, the time-to-digital circuit 214 can include a counter.

Figure 3A:
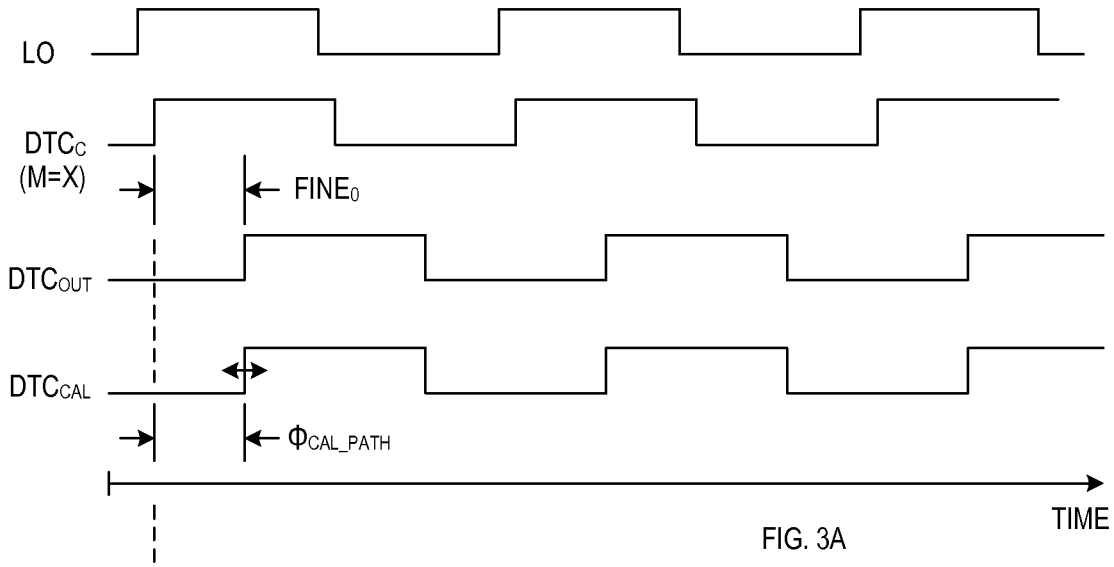
FIGS. 3A and 3B illustrate generally two stages of an example first foreground calibration method that measures one or more coarse delay intervals in terms of fine delay intervals.
Figure 3B:
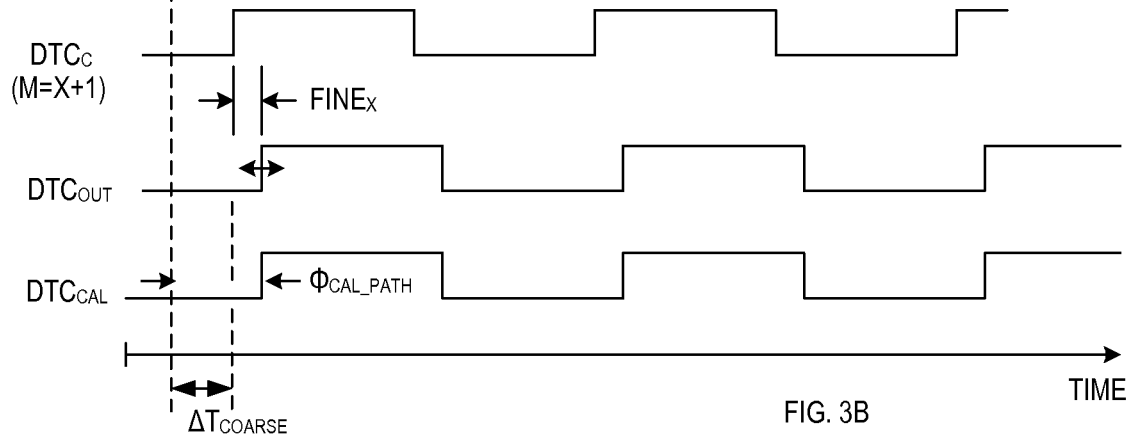

FIGS. 3A and 3B illustrate generally two stages of an example first foreground calibration method that measures one or more coarse delay intervals ($\Delta T_{COARSE}$) in terms of fine delay intervals. FIG. 3A illustrates generally example waveforms for a first stage of an example foreground calibration. In certain examples, the calibration engine 211 of FIG. 2 can place the switch 212 in a second state to provide calibration phase modulation information ($\Phi_{CAL}$) to the DTC 103 and to isolate the DTC 103 from processor phase modulation information ($\Phi$) or preprocessor corrected phase modulation information ($\Phi_{CORR}$). The calibration phase modulation information ($\Phi_{CAL}$) can provide a predefined coarse stage setpoint (M=X) to provide a particular coarse delay output ($DTC_C$) and an initial or first fine stage setpoint ($FINE_0$). The calibration engine 211 can also provide a calibration path setpoint ($\Phi_{CAL\_PATH}$) for the calibration path 213 and can adjust the calibration path setpoint ($\Phi_{CAL\_PATH}$) using the error information ($TDC_{OUT}$) from the time-to-digital circuit 214. The calibration engine 211 can adjust the calibration path setpoint ($\Phi_{CAL\_PATH}$) to align transitions of the calibration path 213 with transitions of the DTC output ($DTC_{OUT}$). In certain examples, this initial stage of the foreground calibration can adjust the calibration path 213 to mimic or provide a representation of the performance of a stage of the DTC such as the fine stage 108 of the DTC 103.

FIG. 3B illustrates generally a second stage of the example foreground calibration that provides an accurate measurement of a coarse delay interval ($\Delta T_{COARSE}$) in terms of the least significant bit of the fine stage setpoint ($FINE_X$), where X can be associated with the particular initial coarse setpoint. In certain examples, the second stage can be executed after completion of the first stage for a given coarse stage setpoint (M). During the second stage of the foreground calibration, the switch 212 can remain in the second state. In certain examples, the calibration engine 211 can adjust the coarse stage setpoint (M=X+1) and can leave the calibration path setpoint ($\Phi_{CAL\_PATH}$) to the adjusted value that in certain examples can represent the first fine stage setpoint ($FINE_0$). The calibration engine 211 can then adjust a second fine stage setpoint ($FINE_X$) such that transitions of the DTC output ($DTC_{OUT}$) align with transitions of the calibration path output ($DTC_{CAL}$). In certain examples, the coarse stage adjustment can represent a minimum coarse stage interval (e.g. an increment or decrement of the coarse stage setpoint by a least significant bit) and the difference between the first and second fine stage setpoints ($FINE_0 - FINE_X$) can represent a range of the fine stage 108 for that particular minimum coarse stage interval. In certain examples, the each stage of the foreground calibration can be repeated for each coarse stage setpoint to provide an accurate map of the delay duration of each coarse stage increment.

Figure 4A:
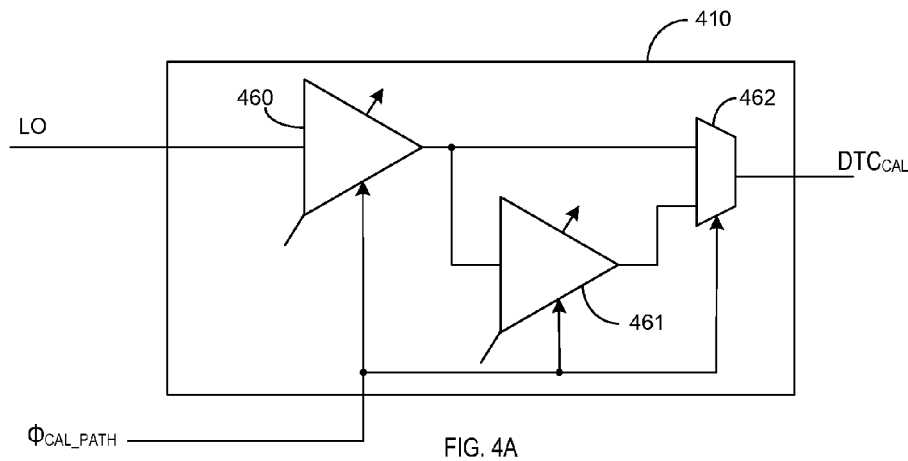
FIG. 4A illustrates generally a calibration path for a DTC including a fine stage employing edge interpolation.
Figure 4B:
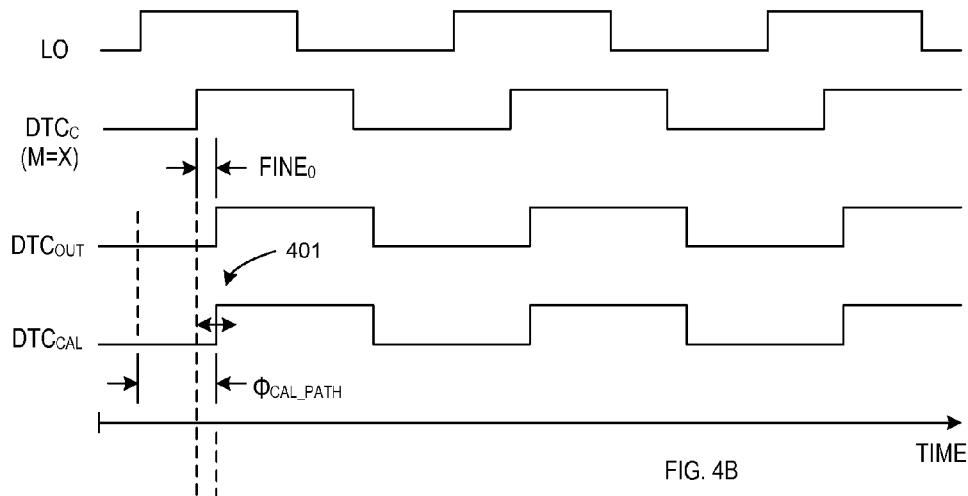
FIGS. 4B and 4C illustrate generally two stages of an example first foreground calibration method that measures one or more coarse delay intervals in terms of fine delay intervals using the calibration path of FIG. 4A.
Figure 4C:
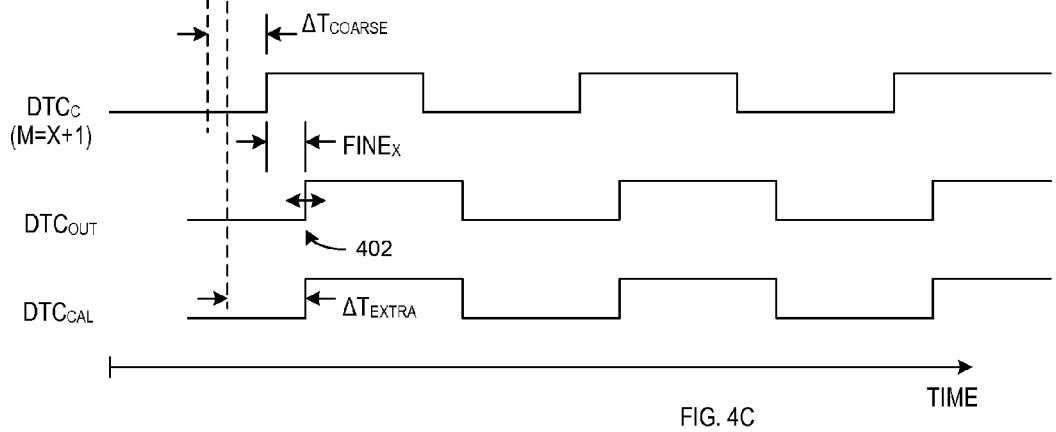

In certain examples, a fine stage of a DTC can use edge interpolation instead of explicit delay elements. In certain examples, a fine stage edge interpolator can receive a first coarse signal and a second coarse signal that is delayed with respect to the first coarse signal. The fine stage edge interpolator can then provide a signal with a predetermined delay between the first and second coarse signals. In such examples, incremental mismatches between coarse increments can be a dominant source of dynamic nonlinearity as the range of the fine stage, by construction, covers the interval between two consecutive coarse phases. Described a little differently, the interpolated fine delay generally does not exceed the coarse delay interval ($\Delta T_{COARSE}$). FIG. 4A illustrates generally a calibration path 410 for a DTC including a fine stage employing edge interpolation. In certain examples, the calibration path can include one or more delay cells 460 that can be used in calibration paths for DTCs including explicit delay cells, an extra delay cell 461, and a multiplexer 462. In certain examples, the extra delay cell 461 can be bypassed during the first stage of the foreground calibration using the multiplexer 462. The extra delay cell 461 can be used to add an extra delay interval ($\Delta T_{EXTRA}$) during the second phase of the calibration to compensate for the edge interpolators inability to provide a delay extending past the nominal incremental coarse interval. In some examples, the extra delay interval ($\Delta T_{EXTRA}$) can be about the same as a nominal coarse delay interval. The first stage of the foreground calibration, illustrated in FIG. 4B, can be executed as previously described. The calibration engine (e.g., FIG. 2, 211) can provide to the DTC a predefined coarse stage setpoint (M=X) to provide a particular coarse delay output ($DTC_C$) and an initial or first fine stage setpoint ($FINE_0$). The calibration engine can then adjust the calibration path setpoint ($\Phi_{CAL\_PATH}$) to align transitions of the calibration path output ($DTC_{CAL}$) with transitions of the DTC output ($DTC_{OUT}$) as shown at 401. During the second stage of the foreground calibration, illustrated in FIG. 4C, the calibration engine can leave the calibration path setpoint ($\Phi_{CAL\_PATH}$) to a value representative of the first fine stage setpoint and can add the extra delay interval ($\Delta T_{EXTRA}$) by enabling the extra delay element, such as by using the multiplexer 462. The calibration engine can adjust the coarse stage setpoint (M=X+1) and can then adjust a second fine stage setpoint ($FINE_X$) such that transitions of the DTC output ($DTC_{OUT}$) align with transitions of the calibration path output ($DTC_{CAL}$) as shown at 402. In certain examples, both the stages of the foreground calibration can be repeated for each increment of the coarse elements or coarse stage of the DTC. The final values of the fine stage setpoint ($FINE_X$) can be saved and the mismatch between the coarse elements can be extracted and measured as a fraction of the period of the reference clock information (LO).

In certain examples, the general equation between the delay of each coarse element X ($c_X$) to the initial fine stage setpoint ($FINE_0$), the final setpoint of the fine stage ($FINE_X$) for each coarse element and the extra delay $\Delta T_{EXTRA}$ can be:

$$c_{X-1} + FINE_0 \cdot \frac{c_X - c_{X-1}}{2^N} + \Delta T_{EXTRA} = c_X + FINE_X \cdot \frac{c_{X+1} - c_X}{2^N}$$

where N is the number of fine bits and $2^N$ the number of fine steps and the fraction express the minimum fine delay, being the interval between two coarse elements divided by the number of elements inside the fine stage. M can be the number of bits used to set the coarse delay and a set of $2^M$ equations (one for each coarse phase) can be evaluated. In an example, the coarse phase equations can be given by setting to an arbitrary value one of the coarse delays (reference delay), the equations can be solved to find each coarse delay and the value of the extra delay. For the general equation, the left hand side can represent the delay between LO and the TDC input on the calibration path in the second stage of the foreground calibration (being a representation of the DTC delay with M=x−1), while the right hand side can be the DTC delay during the second phase but while M=X.

In certain examples, the extra delay can be added between the output of the main DTC and the TDC. In certain examples, during the second phase of the calibration, the calibration engine can adjust the extra delay $\Delta T_{EXTRA}$ such that transitions of the DTC output ($DTC_{OUT}$) align with transitions of the calibration path output ($DTC_{CAL}$).

In certain examples the mismatch information can be used to apply local correction inside the coarse stage 107 of the DTC, instead of correcting the phase modulation information ($\Phi$) inside the pre-processor (104).

Figure 5:
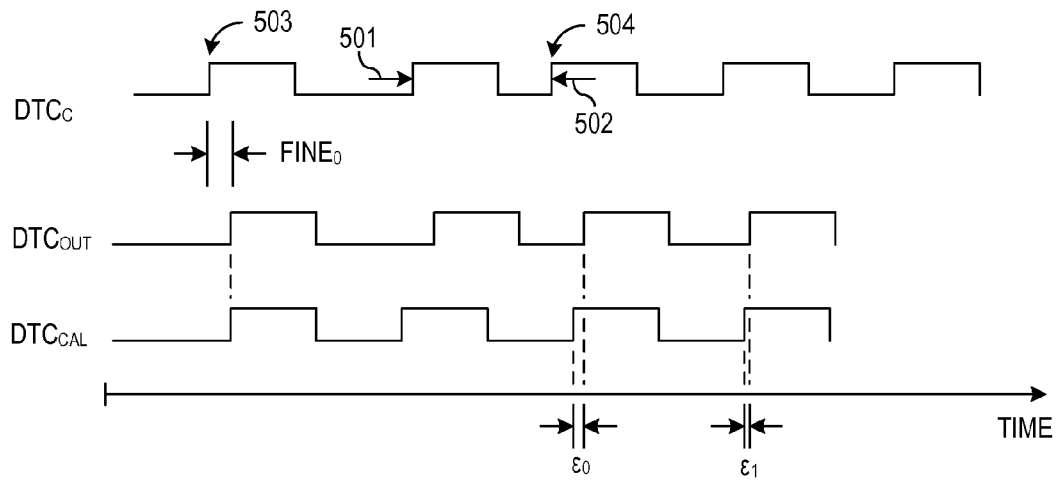
FIG. 5 illustrates generally a second foreground calibration configured to identify dynamic mismatches and to provide compensation information to a preprocessor to compensate for the identified dynamic mismatches of a DTC.

FIG. 5 illustrates generally a second foreground calibration configured to identify dynamic mismatches and to provide compensation information to the preprocessor to compensate for the identified dynamic mismatches. In general, dynamic errors can be generated when DTC modulation changes. For example, when the coarse stage modulation setpoint changes and thus the output ($DTC_C$) of the coarse stage, the input edge that arrives at the fine stage can be late compared to a steady state. This late arrival of the edge can generate a supply glitch in the fine stage due to imperfect low drop out (LDO) supply operation. The supply glitch can cause an error ($\epsilon_X$) in the generated delay, hence phase distortion. Other effects, not necessarily related to imperfect supply, can also give rise to similar dynamic errors in DTCs. For example, in the some DTCs, changes in coarse modulation can generate errors due to incomplete settling of the corresponding waveforms along the DTC, especially at high speeds. In certain cases, without compensation, these dynamic errors can persist for more than one transition of the local oscillator. For fine stages that include a digitally controlled edge interpolator, this error may persists for only one local oscillator edge after the coarse modulation change, however, compensation can still be provided to improve the robustness of the DTC operation. The inventors have recognized that some dynamic errors are deterministic and repeatable and thus, if measured, can be compensated in the preprocessing by appropriately correcting or pre-distorting the DTC modulation word.

In certain examples, the method can assume that the fine stage of the DTC and the calibration path have been synchronized to align for a given fine stage modulation setting ($FINE_0$). The calibration engine can then shift the coarse modulation information. In certain examples, the coarse modulation can shift in a first direction by a first shift amount 501 and then can be shifted in an opposite direction by the same first shift amount 502. Such a shift can result in a first coarse transition 503 and a third coarse transition 504 that have the same phase. The fine stage of the DTC can attempt to maintain the proper modulation through the changes of the coarse stage. However, such changes can include dynamic errors ($\epsilon_X$). In certain examples, the coarse modulation can shift in a direction, while the fine modulation can shift in the opposite direction, such that the total modulation is zero; however, such changes can include dynamic errors ($\epsilon_X$).

In a DTC using a DCDL these errors can be caused by supply glitches associated with DTC modulation (e.g., larger delay requires larger supply current). Supply current variations can create a transient settling in supply voltage depending on DTC input code. These supply variations can be in addition to supply transients due to coarse modulations steps. Such transient settling can be predicted by the LDO dynamics. The supply settling, in turn, can generate DTC error due to DTC delay sensitivity on supply voltage. These interactions can be predicted, as well as, measured and corrected for each modulation change sequence.

For example, since modulation of the calibration path can remain unchanged, the dynamic error can be measured by comparing the output of the DTC ($DTC_{OUT}$) with the output of the calibration path ($DTC_{CAL}$) after the coarse stage shifts 501, 502. In certain examples, the dynamic error can be measured by comparing the output of the DTC ($DTC_{OUT}$) with the output of the calibration path ($DTC_{CAL}$) after the synchronized shift in opposite direction of the coarse and fine stages. In certain examples, dynamic error can be present beyond the first transition following the coarse stage shift. In certain examples, the measured errors ($\epsilon_0$, $\epsilon_1$) can be saved in a lookup table in either the calibration engine or the pre-processor for the DTC. In some examples, the lookup table can be indexed by the coarse shift, the coarse shift amount or combinations thereof. In certain examples, upon normal operation using controller modulation information, the calibration engine or the pre-processor for the DTC can monitor coarse stage modulation information and can introduce compensation information using the lookup table error information associated with changes in coarse modulation. The compensation information can be used to adjust or reduce the measured alignment error anticipated by particular coarse stage shifts indicated within the controller modulation information.

Figure 6:
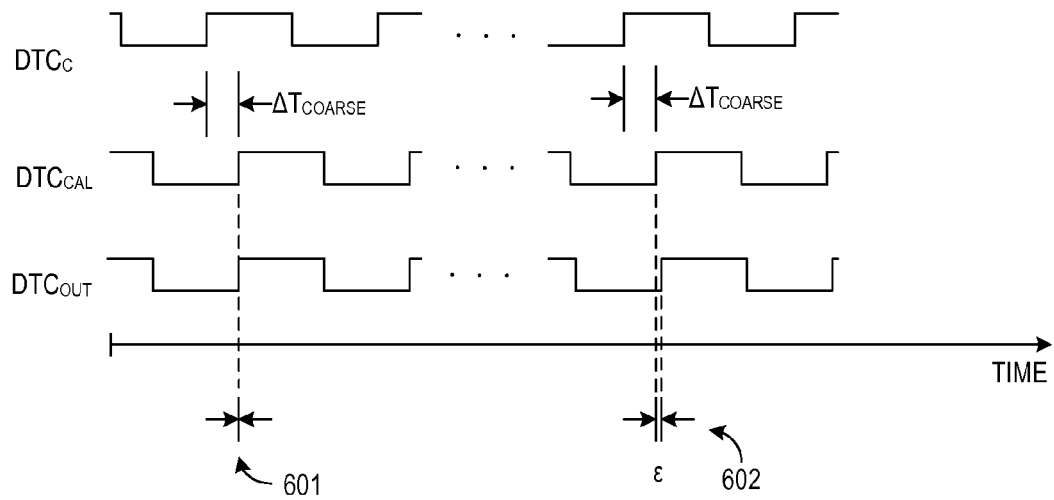
FIG. 6 illustrates generally an example background calibration method of a DTC.

FIG. 6 illustrates generally an example background calibration method of a DTC. In general, divider phases or transitions being generated by DCO edges, are not typically subject to drift (induced by supply and/or temperature variations) like a delay line, therefore, the divider phases can be used as a phase reference for background monitoring of the fine stage gain or the incremental delay for DCDL-based stages.

In the background, the controller modulation information data can be forwarded to the DTC such as by placing the switch 212 of FIG. 2 in the proper state. In certain examples, the calibration engine can set the delay for the calibration path and can enable the TDC, sometimes at particular instances, for example, when a portion of the controller information is equal to a target value. In certain DCDL-based fine stages, the controller modulation information may change only an incremental delay of the fine stage. In certain examples, a copy of the fine stage in the calibration path can be kept in a minimum delay condition, while a copy of the coarse stage in the calibration path is dynamically selecting the next coarse phase compared to the main path. In certain examples, the calibration engine can set the total delay on the calibration path to be COARSE[n]+$\Delta T_{COARSE}$+$t_{min}$, where COARSE[n] can represent the coarse modulation of the main DTC and can change over time as the controller modulation information changes. The main path delay can be defined as COARSE[n]+tmin+$\Delta t_{FINE[n]}$, where the second term $\Delta t_{FINE[n]}$ can be the fine modulation and can change over time as the controller modulation information changes. In certain examples, the calibration engine or the pre-processor can monitor the controller modulation information for a particular fine stage delay (n=n*). In certain examples, the particular fine stage delay (n*) can establish a maximum delay of the fine stage. At the particular fine stage delay, transitions of the fine stage output, or DTC output ($DTC_{OUT}$), should be aligned with the output of the calibration path ($DTC_{CAL}$) as shown at 601. For the calibration path setting from above, the $\Delta t_{FINE[e]}$ delay that is equal to $\Delta T_{COARSE}$, (in certain examples, this represents the maximum delay of the fine stage) should align the outputs of the DTC and the calibration path. In certain examples, the time-to-digital circuit can include a TDC, such as simple, single-bit TDC, to verify correct alignment or to provide misalignment information ($\epsilon$) as shown at 602. As environmental or other influences cause drift in the DTC delay, the TDC can provide a measure of the drift in the form of the misalignment information ($\epsilon$).

Figure 7:
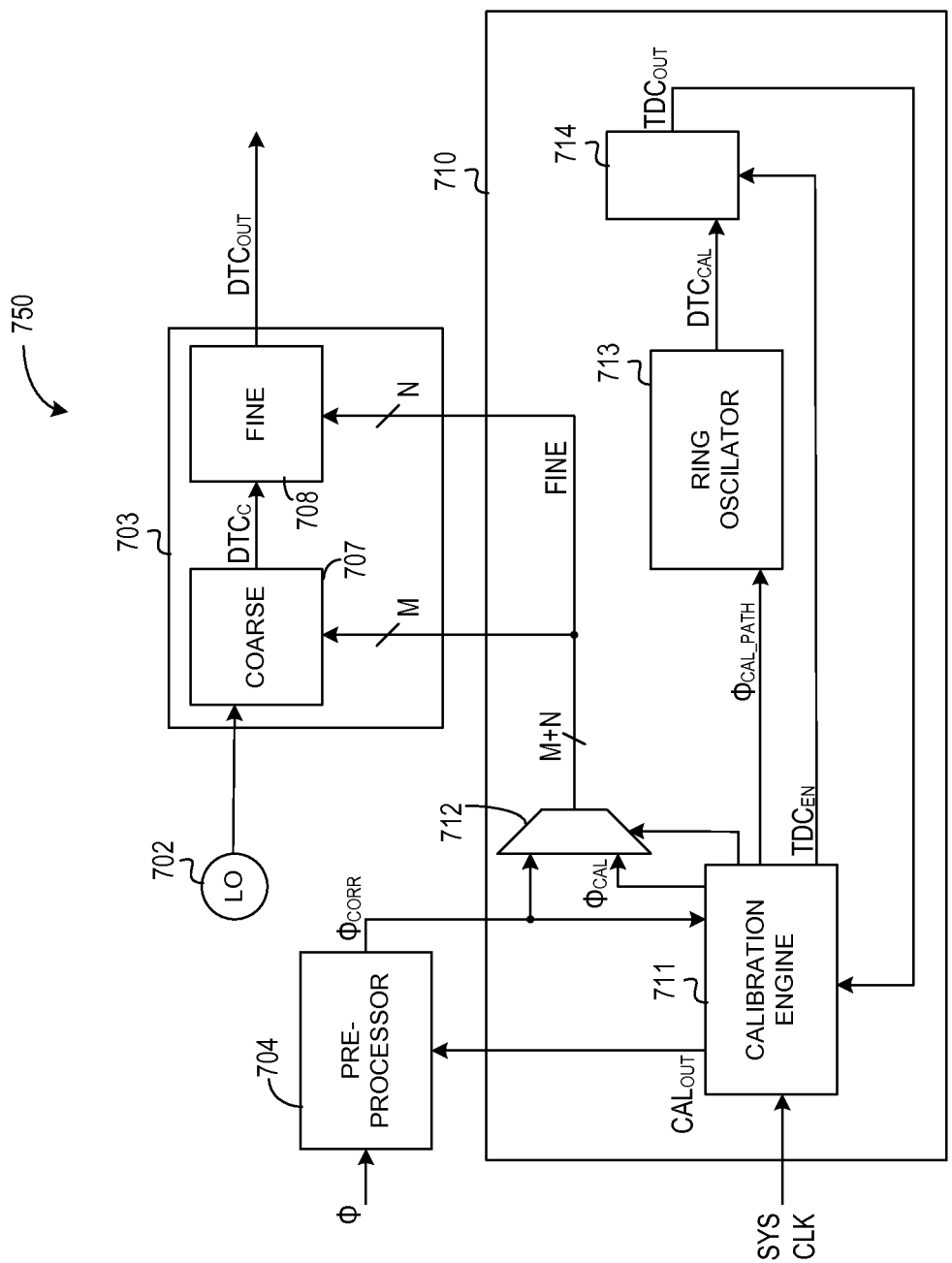
FIG. 7 illustrates generally a DTC-based modulation system including an example calibration system with a calibration path including a ring oscillator.

FIG. 7 illustrates generally a DTC-based modulation system 750 including an example calibration system 710 with a calibration path including a ring oscillator 713. The modulation system 700 can include a local oscillator 702, a DTC 703 including multiple stages 707, 708, a pre-processor 704 and a calibration system 710. In certain examples, the DTC 703 can modulate the clock signal of the local oscillator 702 to provide a phase modulated output signal ($DTC_{OUT}$) at a desired frequency band. The pre-processor 704 can receive phase modulation information ($\Phi$) from a controller such as a baseband processor, DSP or Cordic converter and can provide corrected phase modulation information ($\Phi_{CORR}$) to the stages 707, 708 of the DTC 703. In certain examples, the corrected phase modulation information ($\Phi_{CORR}$) can help ameliorate previously accounted for non-linearity of the DTC 703.

The calibration system 710 can include a calibration engine 711, a switch 712 or multiplexer, a calibration path including a ring oscillator 713, and a counter 714. The calibration engine 711 can supervise and orchestrate calibration functions including both foreground and background calibrations. In certain examples, the calibration engine 711 can receive the corrected calibration information ($\Phi_{CORR}$) from the pre-processor 704 and measurement information ($TDC_{OUT}$) from the counter 714. The switch 712 or multiplexer can allow the corrected calibration information ($\Phi_{CORR}$) to pass to the DTC 703 or can direct calibration modulation information ($\Phi_{CAL}$) from the calibration engine 711 to the DTC 703, for example, for foreground calibration functions such as those described above. In certain examples, the calibration engine 711 can provide a command to select the state of the switch 712. The calibration path can receive setpoint information ($\Phi_{CAL\_PATH}$) from the calibration engine 711 and can provide output information ($DTC_{CAL}$) indicative of the operation of one or more segments of the DTC 703. In certain examples, the calibration system 710 can provide background calibration of a DTC 703 to correct for dynamic environmental changes not accounted for by the pre-processor 704. In certain examples, a ring oscillator based calibration system 710 can include DTC type delay cells to persistently measure the DTC characteristics. The calibration engine 711 can then provide adjustment information ($CAL_{OUT}$) for the DTC. Upon adjustment, the DTC 703 can provide robust, wideband phase modulation that meets required performance targets in real-world conditions. In certain examples, the calibration system 710 can operate in a background mode and can track and provide compensation information for environmental variations without requiring the DTC 703 to be taken offline for recalibration when environmental conditions change. In certain examples, the simplicity of the calibration system 710 requires very little additional hardware and/or chip space.

In certain examples, the ring oscillator 713 can oscillate at a frequency inversely proportional to the delay of the delay cells used within the ring oscillator 713. The calibration engine 711 can set the delay of the ring oscillator 713 to coincide with a delay of the DTC 703 or a portion of the DTC 703 using the received corrected modulation information ($\Phi_{CORR}$). The counter 714 can be used to measure the oscillation frequency of the ring oscillator 713. In certain examples, the counter measurement ($TDC_{OUT}$) can be referenced to an available system clock (SYS CLK). In certain examples, the calibration engine 711 can use the measured delay of the ring oscillator 713 to infer the delay of DTC delay cells and can apply appropriate pre-distortion/correction using the pre-processor 704. In some examples, the counter measurements can be saved, for example by the calibration engine 711, for subsequent comparisons to determine drift of the DTC 703, such as drift due to environmental changes. In some examples, the correction settings ($CAL_{OUT}$) can be applied to the signal-path DTC 703. In some examples, the correction settings ($CAL_{OUT}$) can also be applied to the ring-oscillator delay cells for better matching with the signal-path delay cells.

In certain examples, the delay cells of the ring oscillator 713 can be an exact or scaled-down replica of the delay cells of the DTC 703. In some examples, the delays of the DTC 703 and the delay cells of the ring oscillator 713 can be matched. In certain examples, the delay cells of the ring oscillator 713 can be different from the delay cells of the DTC 703 in order to conserve power and/or circuit area. In certain examples, the ring oscillator 713 can be used in the background to monitor a ring frequency associated with the operation of the DTC 703. If the ring frequency is different from a previous frequency measurement, such a change can indicate that the operation of the DTC 703 has changed such as due to an environmental change including, but not limited to temperature, for example. In some examples, upon detecting such a change, the DTC 703 can then be taken offline for recalibration. In certain examples, simulations or startup measurements can be used to generate a mapping between ring-oscillator delay cell operation and DTC delay cell operation. In the background, the calibration engine can use the ring oscillator frequency to continuously monitor for DTC drift and can adjust the DTC 703 using aforementioned delay mapping to correct for detected drift.

Figure 8:
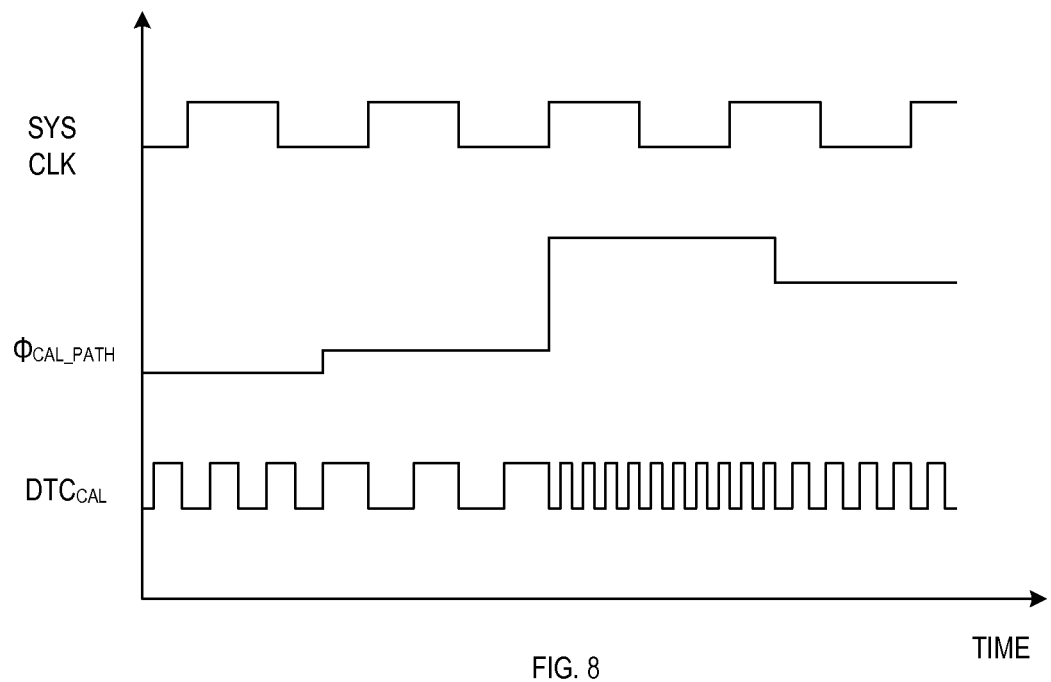
FIG. 8 illustrates generally an example plot of outputs of the example calibration path of FIG. 7.

FIG. 8 illustrates generally an example plot of outputs of the example calibration path of FIG. 7. The plot includes the system clock output (SYS CLK), the calibration path setting ($\Phi_{CAL\_PATH}$) that can be output from the calibration engine, and the output of the ring oscillator ($DTC_{CAL}$). The system clock (SYS CLK) is assumed to provide a clock signal operating a stable frequency, for example, but not limited to, 26 MHz or 38 MHz. The calibration path setting ($\Phi_{CAL\_PATH}$) can be a representation of the modulation information for the DTC or the corrected modulation information for DTC. In certain examples, the calibration path setting ($\Phi_{CAL\_PATH}$) can be a coded representation of the corrected modulation information or a coded representation of a portion of the corrected modulation information. The frequency of the output of the ring oscillator can change with the changing calibration path setting. For a particular calibration path setting, the frequency can be compared to a reference measurement and a difference between the measured frequency and the reference frequency can be an indication of drift of the DTC or a portion of the DTC. In certain examples, the difference can be used to provide additional correction using the preprocessor. In certain examples, providing the additional correction can include using the calibration engine to measure the frequency difference and providing adjusted correction coefficients to the preprocessor.

Figure 9:
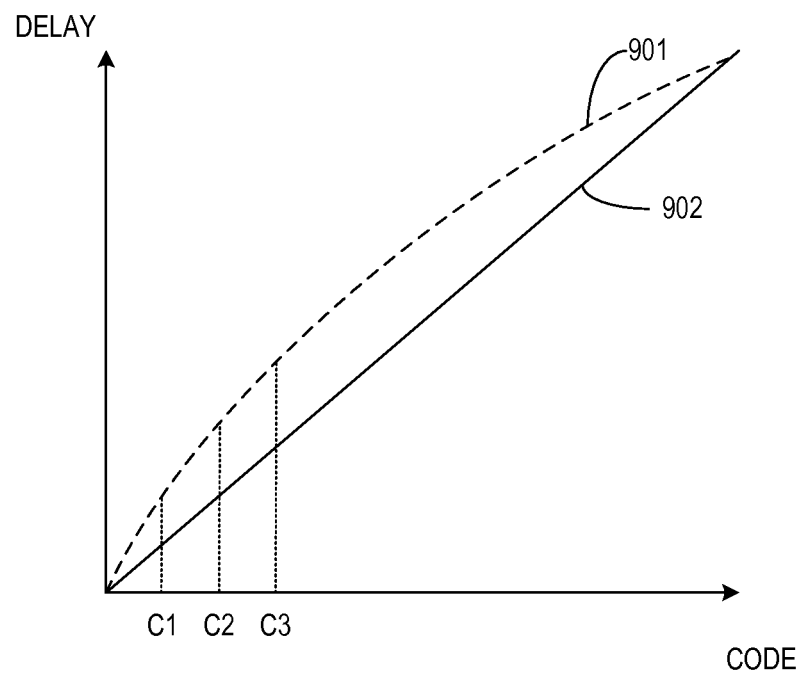
FIG. 9 graphically illustrates interpolation non-linearity of a DTC that can be measured by an example calibration system according to the present subject matter.

In certain examples, either in the background or in a foreground calibration, the example calibration system can initially be used to characterize interpolation non-linearity of the DTC such as by taking delay measurements 902 at different points (C1, C2, C3 . . . ) in the DTC characteristic and comparing the delay to the ideal delay 901 for each point as shown in FIG. 9. The calibration engine or preprocessor can use the inverse of the measured nonlinearity to provide correction, such as by applying an inverse of the measured non-linearity. As discussed above, in certain examples, the characterization and correction of the DTC nonlinearity can be done in a background mode, or background calibration, while the signal-path DTC is providing real-time phase modulation or frequency generation.

Some types of delay cells (e.g. switched capacitor used in DCDL—Digitally Controlled Delay Line) can have a minimum delay ($t_{min}$) an certain examples, the calibration system can extended to use differential measurements to extract the minimum delay. For example, the calibration system of FIG. 6 can be used to measure and record the frequencies associated with the minimum delay code and the maximum delay code. From these measurements, the calibration engine, for example, can provide an estimate of the incremental delay full-scale range, which can then be used to adjust the "gain" by which the DTC-fine code is scaled for proper Coarse-Fine segmentation.

In certain examples, the ring oscillator can be continuously on. In some examples, the ring oscillator can be enabled and disabled to occasionally check and correct for possible drift and to conserve power.

Figure 10:
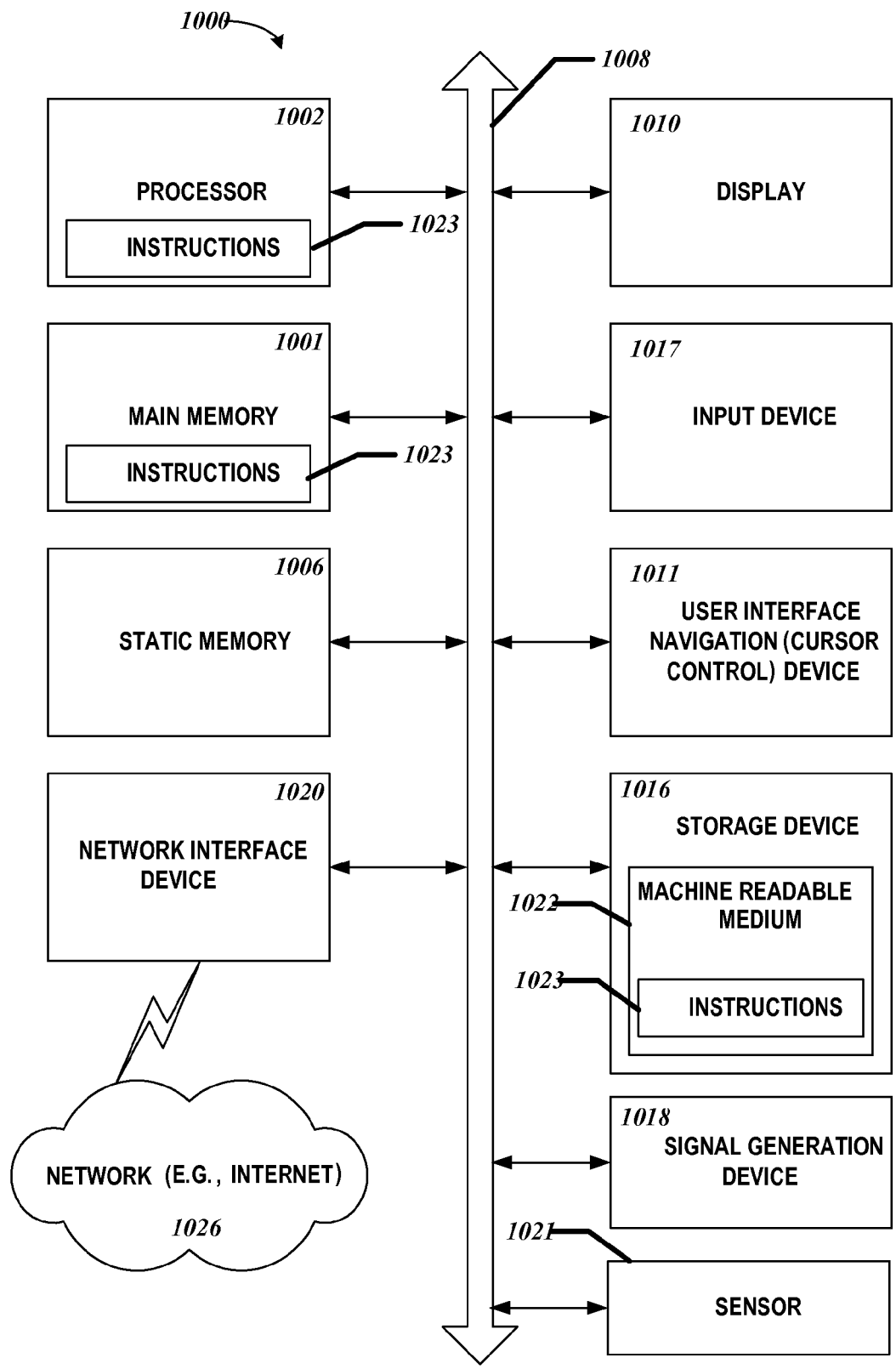
FIG. 10 is a block diagram illustrating an example machine, mobile device, or communication device upon which any one or more of the methodologies herein discussed may be run.

FIG. 10 is a block diagram illustrating an example machine, mobile device, or communication device upon which any one or more of the methodologies herein discussed may be run. In alternative embodiments, the communication device can operate as a standalone device or may be connected (e.g., networked) to other machines. In a networked deployment, such as a telephone network, the communication device may operate in the capacity of either a server or a client communication device in server-client network environments, or it may act as a peer communication device in peer-to-peer (or distributed) network environments. The communication device may be a personal computer (PC), a tablet PC, a set-top box (STB), a Personal Digital Assistant (PDA), a mobile telephone, a web appliance, a network router, switch or bridge, or any communication device capable of executing instructions (sequential or otherwise) that specify actions to be taken by that machine. Further, while only a single communication device is illustrated, the term "communication device" can also be taken to include any collection of communication device that individually or jointly execute a set (or multiple sets) of instructions to perform any one or more of the methodologies discussed herein.

Example communication device 1000 includes a processor 1002 (e.g., a central processing unit (CPU)), a graphics processing unit (GPU) or both), a main memory 1001 and a static memory 1006, which communicate with each other via a bus 1008. The communication device 1000 may further include a display unit 1010, an alphanumeric input device 1017 (e.g., a keyboard), and a user interface (UI) navigation device 1011 (e.g., a mouse). In one embodiment, the display, input device and cursor control device are a touch screen display. In certain examples, the communication device 1000 may additionally include a storage device (e.g., drive unit) 1016, a signal generation device 1018 (e.g., a speaker), a network interface device 1020, and one or more sensors 1021, such as a global positioning system sensor, compass, accelerometer, or other sensor. In certain examples, the processor 1002 can include a context identification circuit. In some embodiments the context identification circuit can be separate from the processor 1001. In certain examples, the context identification circuit can select an audio processing mode corresponding to an identified far-end context. In some examples, the context identification circuit can identify a context using audio information received from a far-end device or audio information received from the processor 1001. In some examples, the context identification circuit can analyze audio information received from a far-end device to identify a context of the far-end. In some examples, the context identification circuit can receive in-band data or out-of-band data including indicia of the far-end context.

The storage device 1016 includes a machine-readable medium 1022 on which is stored one or more sets of data structures and instructions 1023 (e.g., software) embodying or utilized by any one or more of the methodologies or functions described herein. The instructions 1023 may also reside, completely or at least partially, within the main memory 1001 and/or within the processor 1002 during execution thereof by the communication device 1000, the main memory 1001 and the processor 1002 also constituting machine-readable media.

While the machine-readable medium 1022 is illustrated in an example embodiment to be a single medium, the term "machine-readable medium" may include a single medium or multiple media (e.g., a centralized or distributed database, and/or associated caches and servers) that store the one or more instructions 1023. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Electrically Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

The instructions 1023 may further be transmitted or received over a communications network 1026 using a transmission medium via the network interface device 1020 utilizing any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., Wi-Fi® and WiMax® networks). In certain examples, the network interface device can include a DTC-based communication architecture with a calibration circuit as described above with reference to FIGS. 1, 2, 3A-3B, 4A-4C, 5-9 and 11. The term "transmission medium" shall be taken to include any intangible medium that is capable of storing, encoding or carrying instructions for execution by the machine, and includes digital or analog communications signals or other intangible medium to facilitate communication of such software.

In certain examples, the processor 1002 can include one or more processors or processor circuits including a processing circuit configured to determine a far-end context and select a corresponding noise reduction method to ensure successful communications with the far-end context. In certain examples, the processor 1002 can include one or more processors or processor circuits including a processing circuit configured provide context information using an in-band tone or one or more out-of-band frequencies.

Figure 11:
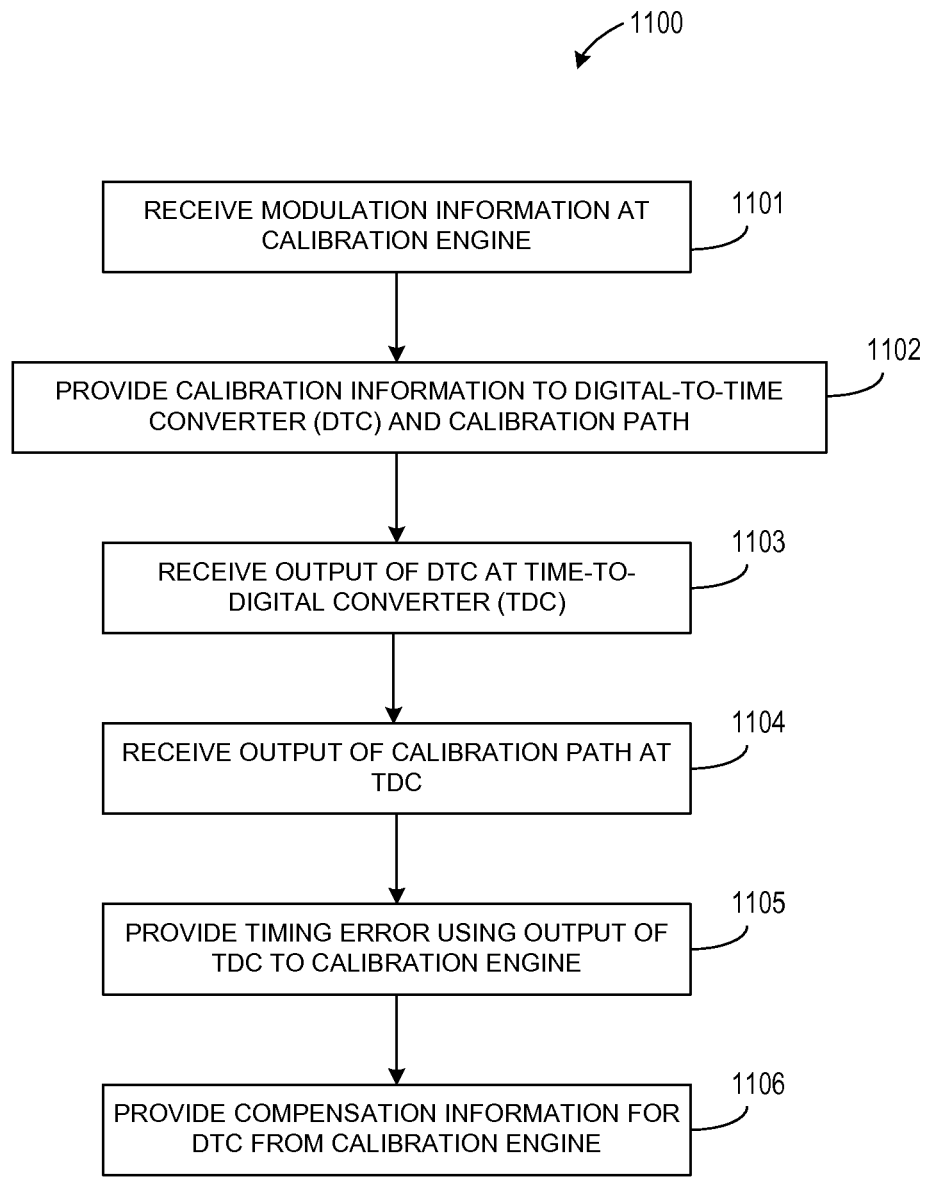
FIG. 11 illustrates generally a flowchart of an example method for calibrating a DTC.

FIG. 11 illustrates generally a flowchart of an example method 1100 for calibrating a DTC, such as a segmented DTC. At 1101, modulation information can be received from a main controller at a calibration engine of a calibration circuit associated with the DTC. At 1102, the calibration engine can provide calibration information to the DTC and to a calibration path of the calibration engine. In certain examples, the calibration path can represent or replicate a segment of the DTC. At 1103, a time-to-digital converter (TDC) of the calibration circuit can receive the output signal of the DTC. At 1104, the TDC can receive the output signal or information from the calibration path. At 1105, the TDC can provide timing error information of the segment to the calibration engine using the output of the DTC and the output of the calibration path. At 1106, the calibration engine can provide compensation information to a correction circuit coupled to the segmented DTC using the timing error information and the calibration engine.

Additional Notes

In Example 1, a calibration circuit for a segmented digital-to-time converter (DTC) can include a calibration path configured to represent a segment of the segmented DTC, a time-to-digital circuit configured to receive an output of the calibration path and the processed frequency information and to provide timing error information of the segment, and a calibration engine configured to receive controller modulation information from a main controller, to provide calibration modulation information to the segmented DTC, to receive the timing error information, and to provide compensation information to a correction circuit coupled to the segmented DTC using the timing error information. In certain examples, the segmented DTC can be configured to receive reference frequency information and to provide processed frequency information.

In Example 2, the calibration circuit of Example 1 optionally includes a switch having a first state and a second state, the first state of the switch configured to provide the controller modulation information to the segmented DTC and to isolate the segmented DTC from the calibration modulation information.

In Example 3, the second state of the switch of any one or more of Examples 1-2 optionally is configured to isolate the controller modulation information from the segmented DTC and to provide the calibration modulation information to the segmented DTC.

In Example 4, the calibration path of any one or more of Examples 1-3 optionally includes a representation of a delay element of the segmented DTC and the calibration engine of any one or more of Examples 1-3, during a first stage of a first foreground calibration, optionally is configured to provide first coarse modulation information to a coarse stage of the segmented DTC, to provide first fine modulation information to a fine stage of the segmented DTC and to the calibration path, and to provide adjustment information to the calibration path using the timing error information to reduce transition errors between output information of the segmented DTC and output information of the calibration path.

In Example 5, the calibration engine of any one or more of Examples 1-4, during a second stage of the first foreground calibration, optionally is configured to provide second coarse modulation information to the coarse stage of the segmented DTC, to continue to provide the adjustment information to the calibration path, to provide second fine modulation information to the fine stage of the segmented DTC to align the output of the segmented DTC with the output of the calibration path, and to subtract the second fine modulation information from the first fine modulation information to identify a first coarse delay interval.

In Example 6, the calibration circuit of any one or more of Examples 1-5 optionally is configured to couple to a DTC including a fine stage edge interpolator, the calibration path of any one or more of Examples 1-5 optionally includes an extra delay element configured to provide a predetermined extra delay during the second stage of the first foreground calibration, and the calibration engine of any one or more of Examples 1-5 optionally is configured to add the extra delay element of the calibration path to the delay of the calibration path during the second stage of the first foreground calibration, and to not add the extra delay element of the calibration path to the delay of the calibration path during the first stage of the first foreground calibration.

In Example 7, for each coarse setting of the coarse stage of the segmented DTC, the calibration engine of any one or more of Examples 1-6 optionally is configured to repeat the first stage and the second stage of the first foreground calibration and to provide coarse delay interval information for each coarse setting to the correction circuit.

In Example 8, during a second foreground calibration configured to execute after completion of the first foreground calibration, the calibration engine of any one or more of Examples 1-7 optionally is configured to provide a first change of the coarse setting in a first direction followed by a second change in an opposite direction, to measure an alignment error between the output of the fine stage and the output of the calibration path after the second change in the opposite direction, and to provide correction information for adjusting the alignment error to the correction circuit.

In Example 9, the calibration engine of any one or more of Examples 1-8, during the first state of the switch, optionally is configured to set the calibration path to a first state indicative of a coarse delay interval and a minimum fine delay interval of the segmented DTC, to identify first fine modulation information within the modulation information, the first fine modulation information configured to establish a maximum delay of the fine stage, and to enable the time-to-digital circuit to provide drift error information corresponding to a difference between a output transition of the calibration path and a corresponding output transition of the segmented DTC.

In Example 10, the calibration engine of any one or more of Examples 1-9 optionally is configured to disable the time-to-digital circuit after receiving the drift error information.

In Example 11, the calibration engine of any one or more of Examples 1-10 optionally is configured to provide a representation of the drift error information to the correction circuit.

In Example 12, the calibration path of any one or more of Examples 1-11 optionally includes a ring oscillator.

In Example 13, a method of calibrating a segmented digital-to-time converter (DTC) can include receiving modulation information at a calibration engine of a calibration circuit from a main controller, providing calibration modulation information to the segmented DTC and a calibration path of the calibration circuit from the calibration engine, the calibration path configured to represent the a segment of the segmented DTC, receiving an output of the DTC at a time-to-digital circuit, receiving an output of the calibration path at the time to digital circuit, providing timing error information of the segment to the calibration engine using the output of the DTC and the output of the calibration path, and providing compensation information to a correction circuit coupled to the segmented DTC using the timing error information and the calibration engine.

In Example 14, the method of any one or more of Examples 1-13 optionally includes providing the calibration modulation information to the segmented DTC using a first state of a switch of the calibration circuit, and isolating the segmented DTC from the controller modulation information using the first state of the switch.

In Example 15, the method of any one or more of Examples 1-14 optionally includes executing a first stage of a first foreground calibration using the calibration engine, wherein executing the first foreground calibration includes providing first coarse modulation information to a coarse stage of the segmented DTC, providing first fine modulation information to a fine stage of the segmented DTC, measuring transition errors of the calibration path using the output of the time-to-digital circuit, and adjusting calibration path modulation information to the calibration path to reduce transition errors between output information of the segmented DTC and output information of the calibration path.

In Example 16, the method of any one or more of Examples 1-15 optionally includes executing a second stage of the first foreground calibration after completion of the first stage, wherein the second stage can include providing second coarse modulation information to the coarse stage of the segmented DTC, providing the adjusted calibration path modulation information to the calibration path, providing second fine modulation information to the fine stage of the segmented DTC to align the output of the segmented DTC with the output of the calibration path, and subtracting the second fine modulation information from the first fine modulation information using the calibration engine to identify a first coarse delay interval.

In Example 17, the calibration circuit of any one or more of Examples 1-16 optionally is configured to couple to a DTC including a fine stage edge interpolator, and the method of any one or more of Examples 1-16 optionally includes enabling an extra delay element configured to provide an additional predetermined extra delay to the calibration path during the second stage of the first foreground calibration, and disabling the extra delay element of the calibration path during the first stage of the first foreground calibration.

In Example 18, the method of any one or more of Examples 1-17 optionally includes repeating the first and second stage of the first foreground calibration for each coarse setting of the coarse stage of the segmented DTC using the calibration engine, and providing coarse delay interval information for each coarse setting to the correction circuit.

In Example 19, the method of any one or more of Examples 1-18 optionally includes executing a second foreground calibration after completion of the first foreground calibration. The second foreground calibration can include providing a first change of the coarse setting in a first direction to the coarse stage followed by second change in an opposite direction of the first change using the calibration engine, measuring an alignment error between the output of the DTC and the output of the calibration path after the second change using the time-to-digital circuit, and providing dynamic correction information for adjusting the alignment error from the calibration engine to the correction circuit using the alignment error.

In Example 20, the method of any one or more of Examples 1-19 optionally includes providing the controller modulation information to the segmented DTC using a second state of the switch, and isolating the segmented DTC from the calibration modulation information using the first state of the switch.

In Example 21, the method of any one or more of Examples 1-20 optionally includes executing a background calibration using the calibration engine. The executing the background calibration can include setting the calibration path to a first state representative of a first delay of the fine stage of the segmented DTC, identifying first fine modulation information within the controller modulation information using the calibration engine, the first fine modulation information configured to establish the first delay of the fine stage, enabling the time-to-digital circuit using the calibration engine, and receiving drift error information corresponding to the first delay of the fine stage at the calibration engine from the time-to-digital circuit.

In Example 22, the executing a background calibration of any one or more of Examples 1-21 optionally includes providing a representation of the drift error information corresponding to the first delay of the fine stage to the correction circuit from the calibration engine.

In Example 23, the executing a background calibration of any one or more of Examples 1-22 optionally includes disabling the time-to-digital circuit after receiving the drift error information corresponding to the first delay of the fine stage.

In Example 24, a mobile device can include a processor, an antenna, and a network interface circuit coupled to the processor and the antenna. The network interface circuit can include a digital to time converter (DTC) configured to receive reference frequency information from a local oscillator, modulation information from the processor and to provide processed frequency information for establishing communication over a network using the antenna, and a calibration circuit configured to provide compensation information for compensating nonlinearity of the DTC. The calibration circuit can include a calibration path configured to represent a segment of the DTC, a time-to-digital circuit configured to receive an output of the calibration path and the processed frequency information and to provide timing error information of the segment, a calibration engine configured to receive controller modulation information from a main controller, to provide calibration modulation information to the DTC, to receive the timing error information, and to provide compensation information to a correction circuit coupled to the DTC using the timing error information, and a switch having a first state and a second state. The first state of the switch can be configured to provide the controller modulation information to the DTC and to isolate the DTC from the calibration modulation information, and the second state of the switch can be configured to isolate the controller modulation information from the DTC and to provide the calibration modulation information to the DTC.

In Example 25, the calibration path of any one or more of Examples 1-24 optionally includes a ring oscillator.

In Example 26, the calibration path of any one or more of Examples 1-25 optionally includes a representation of a delay element of the DTC, wherein the calibration engine, during a first stage of a first foreground calibration, can be configured to provide first coarse modulation information to a coarse stage of the DTC, to provide first fine modulation information to a fine stage of the DTC and to the calibration path, and to provide adjustment information to the calibration path using the timing error information to reduce transition errors between output information of the DTC and output information of the calibration path.

In Example 27, the calibration engine of any one or more of Examples 1-26, during a second stage of the first foreground calibration, optionally is configured to provide second coarse modulation information to the coarse stage of the segmented DTC, to continue to provide the adjustment information to the calibration path, to provide second fine modulation information to the fine stage of the segmented DTC to align the output of the segmented DTC with the output of the calibration path, and to subtract the second fine modulation information from the first fine modulation information to identify a first coarse delay interval.

In Example 28, the calibration circuit of any one or more of Examples 1-27 optionally is configured to couple to a DTC including a fine stage edge interpolator, wherein the calibration path includes an extra delay element configured to provide a predetermined extra delay during the second stage of the first foreground calibration, and wherein the calibration engine is configured to add the extra delay element of the calibration path to the delay of the calibration path during the second stage of the first foreground calibration, and to not add the extra delay element of the calibration path to the delay of the calibration path during the first stage of the first foreground calibration.

In Example 29, for each coarse setting of the coarse stage of the segmented DTC, the calibration engine of any one or more of Examples 1-28 optionally is configured to repeat the first stage and the second stage of the first foreground calibration and to provide coarse delay interval information for each coarse setting to the correction circuit.

In Example 30, during a second foreground calibration configured to execute after completion of the first foreground calibration, the calibration engine of any one or more of Examples 1-29 optionally is configured to provide a first change of the coarse setting in a first direction followed by a second change in an opposite direction, to measure an alignment error between the output of the fine stage and the output of the calibration path after the second change in the opposite direction, and to provide correction information for adjusting the alignment error to the correction circuit.

In Example 31, the calibration engine of any one or more of Examples 1-30, during the first state of the switch, optionally is configured to set the calibration path to a first state indicative of a coarse delay interval and a minimum fine delay interval of the DTC, to identify first fine modulation information within the modulation information, the first fine modulation information configured to establish a maximum delay of the fine stage, and to enable the time-to-digital circuit to provide drift error information corresponding to a difference between a output transition of the calibration path and a corresponding output transition of the DTC.

In Example 32, the calibration engine of any one or more of Examples 1-31 optionally is configured to disable the time-to-digital circuit after receiving the drift error information.

In Example 33, the calibration engine of any one or more of Examples 1-32 optionally is configured to provide a representation of the drift error information to the correction circuit.

Example 34 can include, or can optionally be combined with any portion or combination of any portions of any one or more of Examples 1 through 33 to include, subject matter that can include means for performing any one or more of the functions of Examples 1 through 33, or a machine-readable medium including instructions that, when performed by a machine, cause the machine to perform any one or more of the functions of Examples 1 through 33.

The above detailed description includes references to the accompanying drawings, which form a part of the detailed description. The drawings show, by way of illustration, specific embodiments in which the invention can be practiced. These embodiments are also referred to herein as "examples." All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

What is claimed is:

1. A calibration circuit for a segmented digital-to-time converter (DTC), the segmented DTC configured to receive reference frequency information and to provide processed frequency information, the calibration circuit comprising:
   a calibration path configured to represent a segment of the segmented DTC;
   a time-to-digital circuit configured to receive an output of the calibration path and the processed frequency information and to provide timing error information of the segment;
   a calibration engine configured to receive controller modulation information from a main controller, to provide calibration modulation information to the segmented DTC, to receive the timing error information, and to provide compensation information to a correction circuit coupled to the segmented DTC using the timing error information.

2. The calibration circuit of claim 1, including a switch having a first state and a second state, the first state of the switch configured to provide the controller modulation information to the segmented DTC and to isolate the segmented DTC from the calibration modulation information.

3. The calibration circuit of claim 2, wherein the second state of the switch is configured to isolate the controller modulation information from the segmented DTC and to provide the calibration modulation information to the segmented DTC.

4. The calibration circuit of claim 3, wherein the calibration path includes a representation of a delay element of the segmented DTC;
   wherein the calibration engine, during a first stage of a first foreground calibration, is configured to:
      provide first coarse modulation information to a coarse stage of the segmented DTC;
      provide first fine modulation information to a fine stage of the segmented DTC and to the calibration path; and
      provide adjustment information to the calibration path using the timing error information to reduce transition errors between output information of the segmented DTC and output information of the calibration path.

5. The calibration circuit of claim 4, wherein the calibration engine, during a second stage of the first foreground calibration, is configured to:
   provide second coarse modulation information to the coarse stage of the segmented DTC;
   continue to provide the adjustment information to the calibration path;
   provide second fine modulation information to the fine stage of the segmented DTC to align the output of the segmented DTC with the output of the calibration path; and
   subtract the second fine modulation information from the first fine modulation information to identify a first coarse delay interval.

6. The calibration circuit of claim 5, wherein the calibration circuit is configured to couple to a DTC including a fine stage edge interpolator,
   wherein the calibration path includes an extra delay element configured to provide a predetermined extra delay during the second stage of the first foreground calibration;
   wherein the calibration engine is configured to add the extra delay element of the calibration path to the delay of the calibration path during the second stage of the first foreground calibration, and to not add the extra delay element of the calibration path to the delay of the calibration path during the first stage of the first foreground calibration.

7. The calibration circuit of claim 5, wherein, for each coarse setting of the coarse stage of the segmented DTC, the calibration engine is configured to repeat the first stage and the second stage of the first foreground calibration and to provide coarse delay interval information for each coarse setting to the correction circuit.

8. The calibration circuit of claim 4, wherein, during a second foreground calibration configured to execute after completion of the first foreground calibration, the calibration engine is configured to provide a first change of the coarse setting in a first direction followed by a second change in an opposite direction;
   to measure an alignment error between the output of the fine stage and the output of the calibration path after the second change in the opposite direction; and
   to provide correction information for adjusting the alignment error to the correction circuit.

9. The calibration circuit of claim 2, wherein the calibration engine, during the first state of the switch, is configured:
   to set the calibration path to a first state indicative of a coarse delay interval and a minimum fine delay interval of the segmented DTC;
   to identify first fine modulation information within the modulation information, the first fine modulation information configured to establish a maximum delay of the fine stage; and
   to enable the time-to-digital circuit to provide drift error information corresponding to a difference between a output transition of the calibration path and a corresponding output transition of the segmented DTC.

10. The calibration circuit of claim 9, wherein the calibration engine is configured to disable the time-to-digital circuit after receiving the drift error information.

11. The calibration circuit of claim 9, wherein the calibration engine is configured to provide a representation of the drift error information to the correction circuit.

12. The calibration circuit of claim 1, wherein the calibration path includes a ring oscillator.

13. A method of calibrating a segmented digital-to-time converter (DTC), the method comprising:
   receiving modulation information at a calibration engine of a calibration circuit from a main controller;
   providing calibration modulation information to the segmented DTC and a calibration path of the calibration circuit from the calibration engine, the calibration path configured to represent the a segment of the segmented DTC;
   receiving an output of the DTC at a time-to-digital circuit;
   receiving an output of the calibration path at the time to digital circuit;
   providing timing error information of the segment to the calibration engine using the output of the DTC and the output of the calibration path; and
   providing compensation information to a correction circuit coupled to the segmented DTC using the timing error information and the calibration engine.

14. The method of claim 13, including providing the calibration modulation information to the segmented DTC using a first state of a switch of the calibration circuit; and isolating the segmented DTC from the controller modulation information using the first state of the switch.

15. The method of claim 14, including executing a first stage of a first foreground calibration using the calibration engine, wherein executing the first foreground calibration includes:
    providing first coarse modulation information to a coarse stage of the segmented DTC;
    providing first fine modulation information to a fine stage of the segmented DTC;
    measuring transition errors of the calibration path using the output of the time-to-digital circuit; and
    adjusting calibration path modulation information to the calibration path to reduce transition errors between output information of the segmented DTC and output information of the calibration path.

16. The method of claim 15, including executing a second stage of the first foreground calibration after completion of the first stage, wherein the second stage includes:
    providing second coarse modulation information to the coarse stage of the segmented DTC;
    providing the adjusted calibration path modulation information to the calibration path;
    providing second fine modulation information to the fine stage of the segmented DTC to align the output of the segmented DTC with the output of the calibration path; and
    subtracting the second fine modulation information from the first fine modulation information using the calibration engine to identify a first coarse delay interval.

17. The method of claim 16, wherein the calibration circuit is configured to couple to a DTC including a fine stage edge interpolator, the method including:
    enabling an extra delay element configured to provide an additional predetermined extra delay to the calibration path during the second stage of the first foreground calibration;
    disabling the extra delay element of the calibration path during the first stage of the first foreground calibration.

18. The method of claim 16, including repeating the first and second stage of the first foreground calibration for each coarse setting of the coarse stage of the segmented DTC using the calibration engine; and
    providing coarse delay interval information for each coarse setting to the correction circuit.

19. The method of claim 15, including executing a second foreground calibration after completion of the first foreground calibration, wherein the second foreground calibration includes:
    providing a first change of the coarse setting in a first direction to the coarse stage followed by second change in an opposite direction of the first change using the calibration engine;
    measuring an alignment error between the output of the DTC and the output of the calibration path after the second change using the time-to-digital circuit; and
    providing dynamic correction information for adjusting the alignment error from the calibration engine to the correction circuit using the alignment error.

20. The method of claim 13, including providing the controller modulation information to the segmented DTC using a second state of the switch; and
    isolating the segmented DTC from the calibration modulation information using the first state of the switch.

21. The method of claim 20, including executing a background calibration using the calibration engine, wherein executing the background calibration includes:
    setting the calibration path to a first state representative of a first delay of the fine stage of the segmented DTC;
    identifying first fine modulation information within the controller modulation information using the calibration engine, the first fine modulation information configured to establish the first delay of the fine stage;
    enabling the time-to-digital circuit using the calibration engine; and
    receiving drift error information corresponding to the first delay of the fine stage at the calibration engine from the time-to-digital circuit.

22. The method of claim 21, wherein executing a background calibration includes providing a representation of the drift error information corresponding to the first delay of the fine stage to the correction circuit from the calibration engine.

23. The method of claim 21, wherein executing a background calibration includes disabling the time-to-digital circuit after receiving the drift error information corresponding to the first delay of the fine stage.

* * * * *